United States Patent
Choi et al.

(10) Patent No.: US 6,272,117 B1
(45) Date of Patent: Aug. 7, 2001

(54) DIGITAL SENSING MULTI ACCESS PROTOCOL

(75) Inventors: Kwok Choi, Pleasanton; Raymond Chin, Los Altos, both of CA (US)

(73) Assignee: GWcom, Inc., Santa Clara, CA (US)

( * ) Notice: Subject to any disclaimer, the term of this patent is extended or adjusted under 35 U.S.C. 154(b) by 0 days.

(21) Appl. No.: 09/027,409

(22) Filed: Feb. 20, 1998

(51) Int. Cl.$^7$ ........................................... H04Q 7/00
(52) U.S. Cl. ..................... 370/330; 370/348; 370/349
(58) Field of Search .................................. 370/328, 229, 370/336, 337, 345, 347, 349, 442, 340, 330, 341, 348

(56) References Cited

U.S. PATENT DOCUMENTS

| | | | |
|---|---|---|---|
| 5,161,154 | * 11/1992 | Diaz et al. | 370/348 |
| 5,329,530 | * 7/1994 | Kojima | 370/348 |
| 5,377,192 | * 12/1994 | Goodings et al. | 370/348 |
| 5,598,417 | * 1/1997 | Crisler et al. | 370/348 |
| 5,729,541 | * 3/1998 | Hamalainen et al. | 370/337 |

\* cited by examiner

Primary Examiner—Ricky Ngo
(74) Attorney, Agent, or Firm—Skjerven Morrill MacPherson LLP; Edward C. Kwok; Carmen C. Cook

(57) ABSTRACT

A wireless data network, including a base station and multiple mobile wireless terminals, implements a synchronous 2-way communication protocol in which the availability of a communication channel is signalled by the base station in a control packet. The multiple mobile wireless terminals compete for acquisition of the communication channel by sending a request packet, upon detecting from the control packet that the communication channel is available. The base station grants the channel by acknowledging the request packet of a selected one of the mobile wireless data terminal. The mobile wireless data terminal communicates with the base station over the communication channel subsequent to acquisition. Upon the wireless data terminal relinquishing the communication channel, the base station sends out the next control packet indicating that the communication channel is again available.

22 Claims, 5 Drawing Sheets

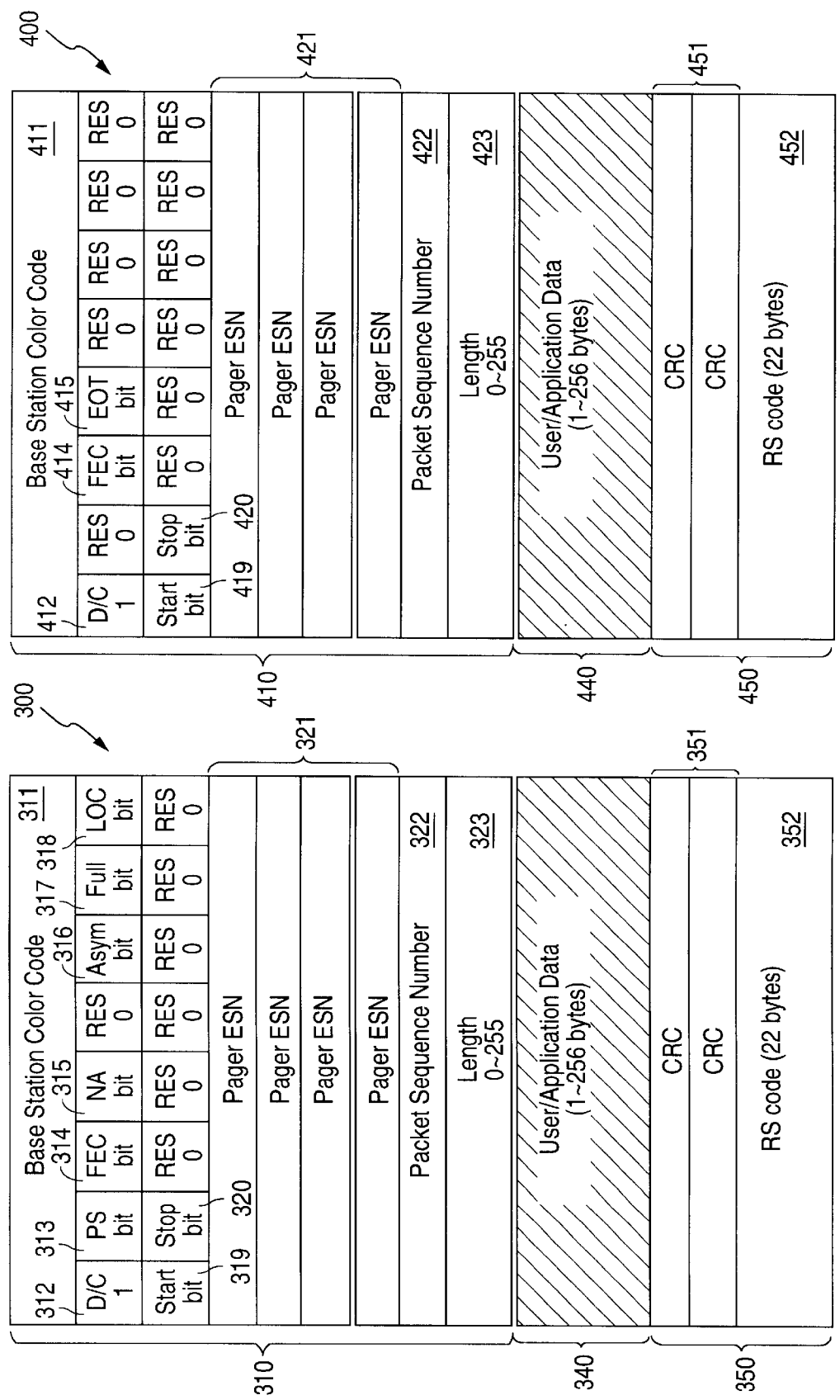

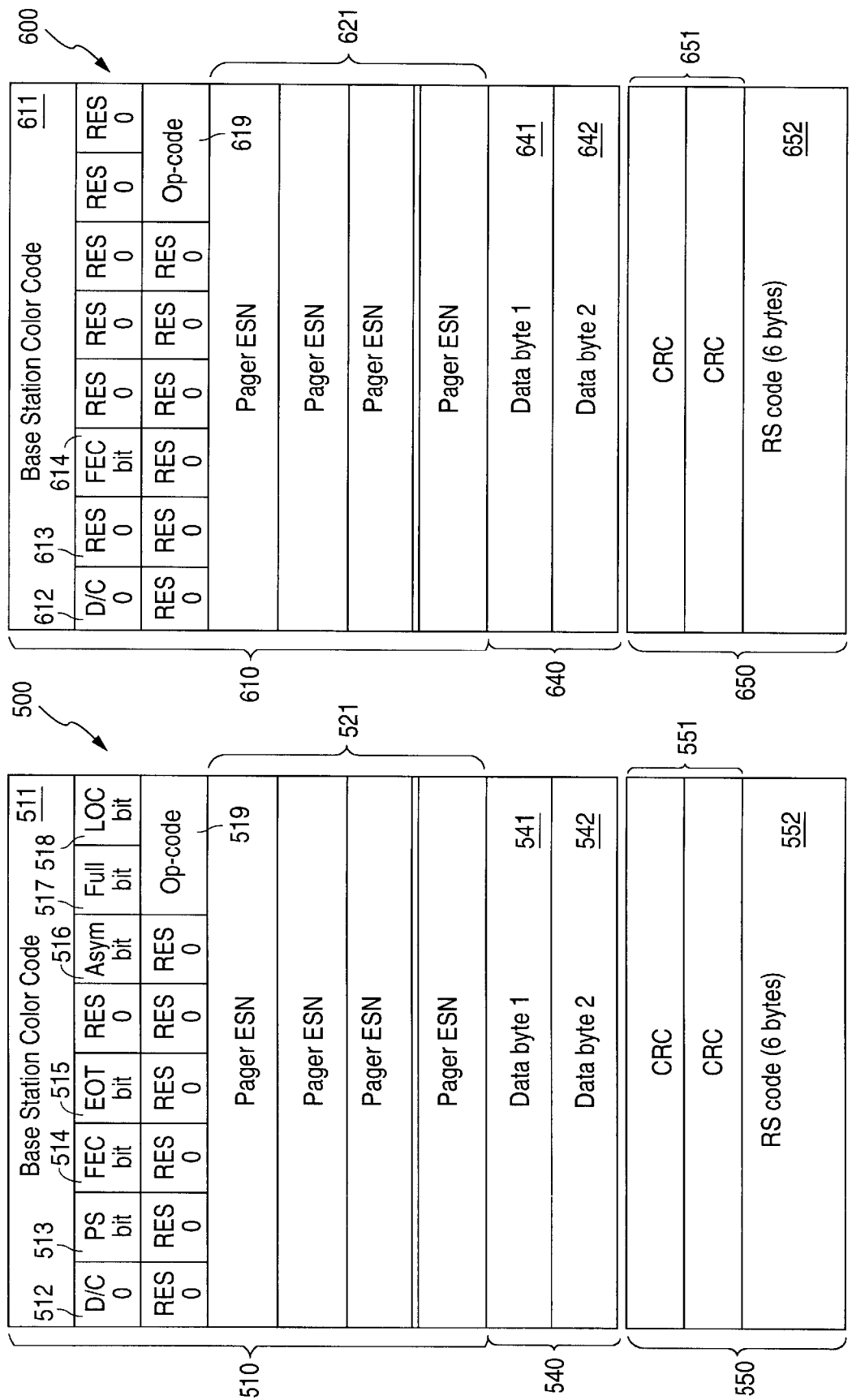

DIGITAL SENSING MULTI ACCESS PROTOCOL

CROSS REFERENCE TO RELATED PATENT APPLICATIONS

The present application is related to copending and commonly assigned U.S. patent application ("Copending Application"), Ser. No. 08/915,078, entitled "COMMUNICATION PROTOCOL FOR A WIRELESS DATA SYSTEM", by Kwok Choi, now abandoned in favor of U.S. patent application, Ser. No. 09/574,686, which is a divisional application of the Copending Application. The Copending Application and the '686 application are incorporated herein by reference in their entireties.

BACKGROUND OF THE INVENTION

1. Field of the Invention

The present invention generally relates to wireless data communication; and in particular, the present invention relates to network access protocols used in wireless data communication.

2. Background of the Invention

An example of a network access protocol for a two-way wireless data network is shown in FIG. 1 and described in detail in commonly assigned U.S. Patent Application ("'860 Application"), Ser. No. 08/542,860, entitled "TWO-WAY WIRELESS DATA NETWORK", by Weijia Wang, now U.S. Pat. No. 5,898,904, issued on Apr. 27, 1999. The '760 Application is incorporated herein by reference in its entirety.

As shown in FIG. 1, a wireless data network 100 includes a wireless data terminal 101, a cellularized base station 102, a message control center 103, interfaces 105–109 to information and communication applications, and radio links 115 and 117. Message control center 103 provides a high power transmitter capable of broadcasting over a paging channel to wireless data terminals within the entire service area of wireless data network 100. In this manner, wireless data network 100 is compatible with existing one-way paging services. Message control center 103 also communicates with base station 102 through radio link 117 which is a high power transmission (e.g. 3 watts).

Base station 102 is one of a number of base stations that are distributed throughout the service area of wireless data network 100. Each base station serves a portion of the service area of wireless data network 100 within its immediate vicinity. The local service area of a base station is sometimes called a "cell". The base stations broadcast to wireless data terminals in their respective cells through a local channel. Typically, the base stations cumulatively serve all locations within the service area of the wireless data network 100. Wireless data terminal 101 communicates with one or more of the base stations, e.g., base station 102, through radio link 115. Radio link 115 needs only provide a low power transmission (e.g. 100 mW) to service the local service area. When wireless data terminal is outside the local service area of any base station, wireless data terminal 101 is restricted only to receiving messages from the 1-way paging channel. Other details of the operation of the two-way wireless data network can be found in the aforementioned '860 Application and incorporated by reference above.

Enhancements to the network access scheme described above have been suggested so as to increase the network bandwidth and channel utilization of a two-way wireless data network. One such enhancement is described the Copending Application incorporated by reference above. The Copending Application discloses a network access protocol, referred to as the capture division packet access (CDPA) protocol, which allows a wireless data terminal to camp onto a local base station for two-way communication whenever the wireless data terminal is within the service range of the base station, thus bypassing the message control center all together. Under the "local override" mode of the CDPA protocol, a wireless data terminal registers with a local base station upon entering the local service area of the local base station, and subsequently communicates with that base station over the local channel. The local override mode avoids the undesired latency associated with high message traffic conditions in the paging channel. The CDPA protocol also supports a "local-only" mode in which the wireless data terminal ignores communication over the paging channel and camps onto the local channel at all times for two-way communication.

The CDPA protocol described in the Copending Application also includes other performance enhancement features. For instance, the CDPA protocol supports asymmetric downlink and uplink coverage areas in the local channel. The coverage pattern, i.e., the downlink coverage area is larger than the uplink coverage area, allows incremental start-up of a new 2-2-way wireless communication system. Under an asymmetric coverage area scheme, a wireless data terminal carries out two-way communication with a base station while within the uplink coverage area, and receives messages from the base station when outside the uplink coverage area but still within the downlink coverage area.

The CDPA protocol described in the Copending Application uses a variable speed retry scheme to avoid collision in the uplink and to extend the range of uplink communication. Under the variable speed retry scheme, when a previous transmission is unsuccessful, a wireless data terminal retransmits the data packet using alternatively a high data rate transmission and a low data rate transmission. Furthermore, the retransmissions are attempted at randomized time intervals so as to minimize collision with other wireless data terminals competing for the uplink. Other aspects of the CDPA protocol are described in details in the Copending Application incorporated by reference above.

The CDPA protocol described above is particularly useful when a wireless data terminal communicates primarily with a small number of local base stations. As described in the Copending Application, an example of such an application is found in a hospital where a user typically receives messages originated and received within the hospital during the normal work day. In that application, the hospital usually can be serviced by at most a small number of base stations under the control of a local message control center, forming what is sometimes referred to as a "private" system. The CDPA protocol supports wireless network communication both within the private system and outside the private system, sometimes referred to as the "public" system.

Performance problems can arise in the application described above where two-way communication is provided by a private system operating within a public system. For example, to provide coverage within a private system, base stations are sometimes installed closer together than they need to be in the counterpart public system. Such close deployment of base stations can result in overlapping coverage areas in the open space within the service area of the private system. When a wireless data terminal is operating in a coverage area of overlap, the wireless data terminal receives communications from more than one base station.

However, interference among these base stations ("co-channel interference") can occur, causing the wireless data terminal to receive no packet at all or unable to transmit to any of the base stations. A network access scheme capable of minimizing co-channel interference improves efficiency of the two-way wireless data network.

In the two-way wireless data network described above, wireless data terminals compete for the uplink bandwidth. Collisions resulting from simultaneous transmissions by two or more wireless data terminals can occur to significantly reduce the channel utilization rate. For instance, packet collisions are very common under the ALOHA protocol because wireless data terminals transmit without regard to channel availability. Collision avoidance schemes, such as the variable speed retry scheme described above, increase channel utilization.

SUMMARY OF THE INVENTION

The present invention provides a network access protocol which minimizes collisions in the uplink communication and reduces the number of retries needed for a successful uplink transmission. The network access protocol implemented according to the present invention, referred to as the digital sensing multiple access protocol with request-to-send and clear-to-send (the "DSMA/RC protocol"), improves channel utilization rate and transmission performance. Under the DSMA/RC protocol, collision is possible only in the first uplink data packet of a message. Subsequent data packets are transmitted without collision.

In one embodiment of the present invention, a method is provided in a two-way communication network. The method includes the steps of: (a) providing a communication channel having first and second sets of time slots; (b) providing a base station serving a service area and having a transceiver for communicating by radio in the communication channel; (c) sending a message from the base station in a first set of time slots indicating whether the communication channel is available; (d) allowing one or more mobile data terminals to transmit a request for access to the communication channel upon receiving the message from the base station; and (e) receiving at the base station the request for access to the communication channel in the second set of time slots, and (f) granting the request for access to the communication channel to the requesting mobile wireless data terminal.

In one implementation of the method, the message indicating communication channel availability is provided in a field within a header of a control packet. The indication of channel availability can be piggy-backed onto an acknowledgment message sent by the base station in response to a previous message received from the mobile wireless data terminal.

A protocol under the present invention can be implemented in both dual-frequency and single-frequency communication channels. Further, the protocol can be implemented in a full-duplex mode or a half-duplex mode.

In one implementation, the communication channel is divided into multiple logical channels. In one implementation, one of the logical channels provides for transmission of data packets from the wireless data terminal to the base station, and transmission of control packets from the base station to the mobile wireless data terminal. The data packets are sent in a predetermined sequence by the mobile wireless data terminal, and acknowledged one by one by the base station in one of the control packets. Each acknowledgment from the base station signals to the mobile wireless data terminal that the base station is ready to receive the next data packet in the predetermined sequence from the mobile wireless data terminal.

The present invention is better understood upon consideration of the detailed description below and the accompanying drawings.

BRIEF DESCRIPTION OF THE DRAWINGS

FIG. 3 shows the data fields of a downlink data packet under the DSMA/RC protocol of the present invention.

FIG. 4 shows the data fields of a uplink data packet under the DSMA/RC protocol of the present invention.

FIG. 5 shows the data fields of a downlink control packet under the DSMA/RC protocol of the present invention.

FIG. 6 shows the data fields of a uplink control packet under the DSMA/RC protocol of the present invention.

In the detailed description below, like objects which appear in more than one figure are provided with like reference numerals.

DETAILED DESCRIPTION OF THE PREFERRED EMBODIMENTS

The present invention provides a synchronous wireless communication protocol, referred to as "digital-sensing multi-access with request-to-send and clear-to-send control" ("DSMA/RC"), for use within two-way communication systems, including a two-communication system served by both a broadcast communication system (e.g. paging) and a "cellular" two-way communication system. In a cellular two-way communication system, the total service area is provided a number of base stations each serving a designated local service area within the total service area. Communication between a wireless data terminal and a base station can be half-duplex, full-duplex, single-frequency, or dual-frequency. In a dual-frequency system, the uplink (i.e., wireless terminal to base station) and the downlink (i.e., base station to wireless data terminal) use different frequencies. The uplink and the downlink can also operate at different data rates (e.g., 1200 baud for the uplink and 9600 baud for the downlink).

The DSMA/RC protocol supports a wireless data network operating under either a normal mode, a local override mode, or a local-only mode. In the normal mode, the wireless data network includes a message control center broadcasting over the paging channel and local stations communicating with wireless terminals over the local channel. A wireless data terminal camps on the paging channel for a wake-up message from a message control center. Upon receipt of such a wake-up message, the wireless data terminal switches to a local base station for two-way communication. A wireless data network using DSMA/RC can use one or more frequencies for communication between a base station and wireless data terminals.

Figure 1:
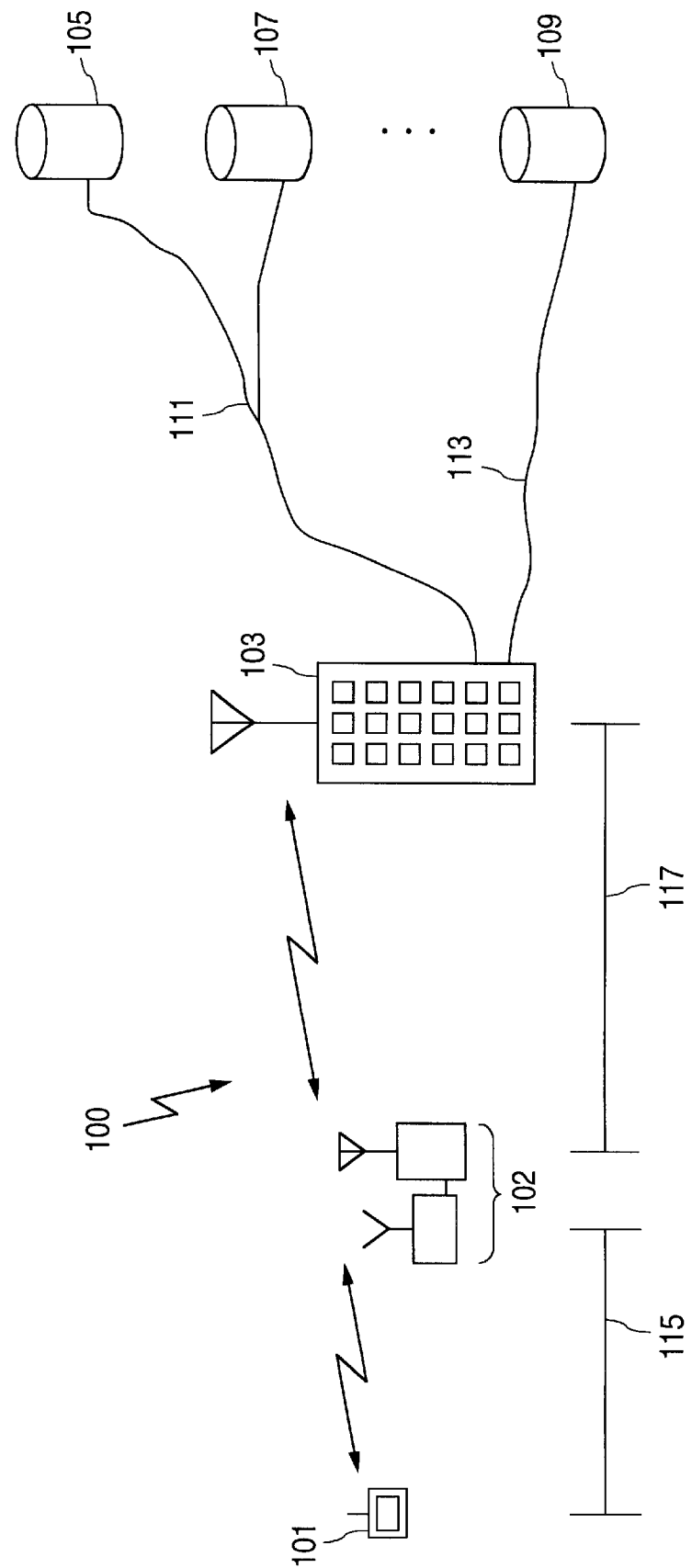
FIG. 1 illustrates a wireless data network 100 to which the present invention is applicable.
Figure 2A:
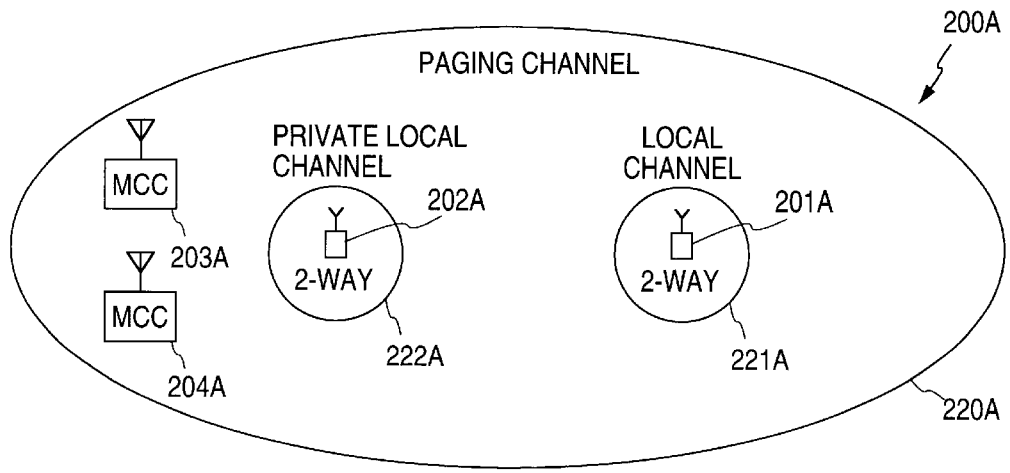
FIG. 2a illustrates, in service area 220A of a wireless data network 200A, private system 222A supporting a local override mode of a DSMA/RC protocol, in accordance with the present invention.

One embodiment of the present invention is illustrated by a wireless data network 200A operating under DSMA/RC shown in FIG. 2A. Wireless data network 200A includes both a public system and a private system within service area 220A. For the purpose of this description, the private system is referred to by its service area as private system 222A. The service area of private system 222A is served by a base station 202A. Private system 222A is controlled by a private message control center 204A and one or more base stations. Wireless data network 200A also includes areas served by the public system, such as service area 221A served by base station 201A. According to the DSMA/RC protocol of the present invention, when a wireless data terminal enters private system 222A, the wireless data terminal registers with private base station 202A and camps onto the local channel for two-way communication. When the wireless data terminal exists private system 222A, the wireless data terminal registers with other public systems within wireless data network 200A for two-way communication. A local registration scheme such as that disclosed in the aforementioned Copending Application can be adopted in the DSMA/RC protocol for operating the local override mode in wireless data network 200A. Wireless data network 200A can also operate, under the DSMA/RC protocol, in the local-only mode. Under the local-only mode, a wireless data terminal does not receive communication from the paging channel. Instead, a wireless data terminal within wireless data network 200A camps at all times on the local channel to which the wireless data terminal is registered. In one embodiment, the local modes (i.e., local override and local-only) under DSMA/RC are selected by setting a "LOC" bit in the downlink data or control packet. The formats of the data and control packets under DSMA/RC are described in more details below.

Figure 2B:
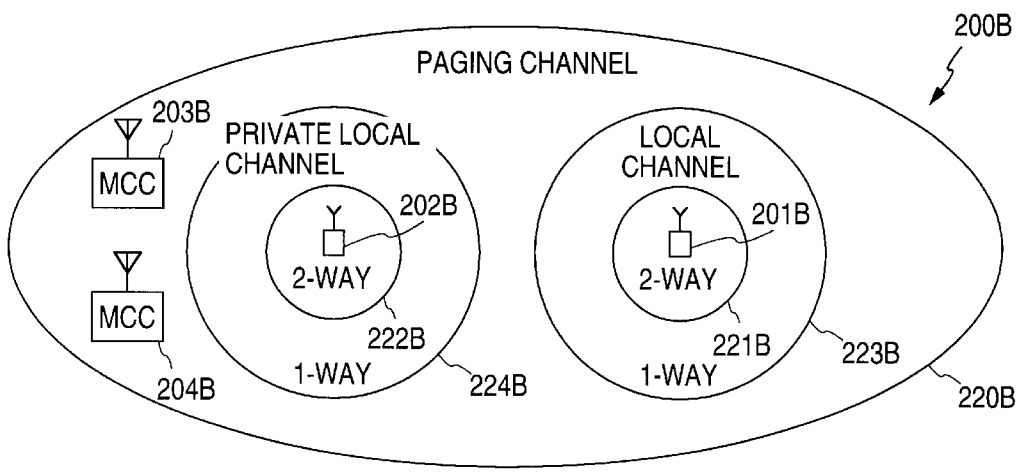
FIG. 2b illustrates, in service area 220B of a wireless data network 200B, private system 222B operating according to an asymmetric area coverage scheme, in accordance with the present invention.

A wireless data network under DSMA/RC can support an asymmetric downlink and uplink coverage area pattern. Such a wireless data network is illustrated by wireless data network 200B of FIG. 2B. In FIG. 2B, a private system 222B within service area 220B includes base station 202B. As shown in FIG. 2B, base station 202B has an uplink range 222B, within which a wireless terminal communicates bidirectionally with base station 202B, and a downlink range 224B, within which the wireless data terminal only receives messages from base station 202B via the local channel.

A wireless data network under DSMA/RC can also support asymmetric data transmission rates. Asymmetric data rates can be advantageously employed to extend the uplink distance without correspondingly increasing the power requirements for a wireless data terminal. In accordance with the packet format described below, an "Asym" bit in the downlink packet indicates whether a wireless data terminal should use asymmetric communication. When the Asym bit is reset, the uplink and the downlink data rates are the same (i.e. symmetric), typically at 9600 baud. Alternately, when Asym bit is set, the downlink transmits at a higher data rate (e.g. 9600 baud) while the uplink transmits at a lower data rate, such as 1200 baud. The lower uplink data rate makes possible a longer uplink distance.

The DSMA/RC protocol of the present invention uses time-division multiplexing (TDM) to allocate bandwidths of one or more physicals channel among one or more logical channels. One example of full-duplex operations under the DSMA/RC using two physical channels 751a and 751b is illustrated by FIG. 7a. As shown in FIG. 7a, physical channels 751a and 751b, each assigned a different frequency, are allocated to provide a downlink and an uplink, respectively. Under full duplex operation, both physical channels can be simultaneously active (i.e., transmitting simultaneously). In FIG. 7a, a control packet, which is typically a short packet used to provide such control information as acknowledgment or non-acknowledgment ("ACK packet" or "NACK packet"), is transmitted in a frame represented by a small rectangle, and a data packet is transmitted in a frame represented by a large rectangle. The space between rectangles represents "guard" times (i.e., time periods of brief predetermined durations provided to prevent interference between transmissions). As discussed below with respect to FIG. 7c, a frame includes either a control packet or a data packet, along with certain preamble and synchronization information.

As shown in FIG. 7a, physical channels 751a and 751b are divided among five logical channels: message channels 752, 754, 755 and 756 and a "command" channel 753. Message channels 752 and 756 are uplink message channels which allows data packets to be sent from wireless data terminals to a base station, and control packets to be sent from the base station to the wireless data terminals. For example, as shown in the FIG. 7a, data packets in frames 756a and 756c are data packets of message channel 756 from one or more wireless data terminals assigned to message channel 756 to a base station, and control packets in frames 756b and 756d are control packets of message channel 756 from the base station to the wireless data terminals. Similarly, control packets in frames 752a and 752c are control packets of message channel 752 sent from the base station to the wireless data terminals assigned to message channel 752, and data packets in frames 752b and 752d are data packets from the wireless data terminals of message channel 752 to the base station. Message channels 754 and 755 are downlink message channels, which operate analogously as described above for message channels 752 and 756, except that data packets are sent from the base station to the wireless terminals of message channels 754 and 755, and control packets are sent from the wireless data terminals of message channels 754 and 755 to the base station.

Command channel 753 is used for transmitting control packets only, and the command channel time slots in both physical channels 751a and 751b are assigned to the base station and the wireless data terminals in a predetermined pattern. The pattern shown in FIG. 7a, for example, assigns the time slots for control packets in frames 753a–753h alternately between downlink communication (physical channel 751a) and uplink communication (physical channel 751b).

The DSMA/RC protocol can also be implemented for half-duplex operations (i.e., downlink communication and uplink communication cannot occur simultaneously). FIG. 7b shows an implementation of half-duplex operations of the DSMA/RC protocol using physical channels 751a and 751b. As shown in FIG. 7b, under a half-duplex operation, physical channels 751a and 751b are divided among three logical channels: message channels 771 and 772, and command channel 773. As shown in FIG. 7b, message channel 771 allows transmission of uplink data packets (e.g., data packets in frames 771b and 771d) from the wireless data terminals to a base station, and transmission of downlink control data packets (e.g. control data packets in frames 771a and 771c) from the base to the wireless data terminals. In an analogous manner, message channel 772 allows transmission of downlink data packets (e.g., data packets in frames 772a and 772c) from base station to the wireless data terminals, and transmission of uplink control data packets (e.g. data packets in frames 772b and 772d) from the wireless data terminals to the base station. Command channel 773 sends control packets (e.g., control packets in frames 773a–773d) in both physical channels 751a and 751b under a predetermined TDM pattern. As shown in FIG. 7b, time slots are allocated in physical channels 751a and 751b in an alternating pattern. The command channel is typically used for such function as local registration (i.e. notification by a wireless data terminal to a base station that the wireless data terminal is in the base station's local service area). In this embodiment, local registration is initiated by a wireless data terminal sending a "local registration request" (LRR) control packet (e.g., control packet in frame 753a) of command channel 753 in physical channel 751b, and completes when the base station returns a "local registration granted" (LRG) in a control packet (e.g., control packet in frame 753b) of command channel 753 in physical channel 751a.

Half-duplex operation under the DSMA/RC protocol can also be implemented using a single frequency (i.e., a single physical channel). For example, if physical channels 751a and 751b use the same frequency, the implementation shown in FIG. 7b would illustrate operations of three logical channels 771–773 under the single-frequency half-duplex mode of the DSMA/RC protocol.

Although FIGS. 7a and 7b each illustrate physical channels 751a and 751b to be symmetrical (i.e., providing the same data rate), asymmetric implementations, i.e., different data rates in the uplink and downlink physical channels can be implemented. In asymmetric implementations, since the packet time in each physical channel is different, the number of message channels, or the number of time slots allocated to each logical channels, assigned to each physical channel is often different to ensure efficient use of the respective bandwidths. In the present embodiment, synchronization between the base station and the wireless data terminals for implementing any mode of the DSMA/RC protocol is provided by the base station. The base station can acquire its time base in a number of ways, for example, through signals received from the Global Positioning System (GPS) or by monitoring a broadcast source. The wireless data terminal acquires its time base by monitoring a synchronization sequence in the downlink communication.

Figure 7C:
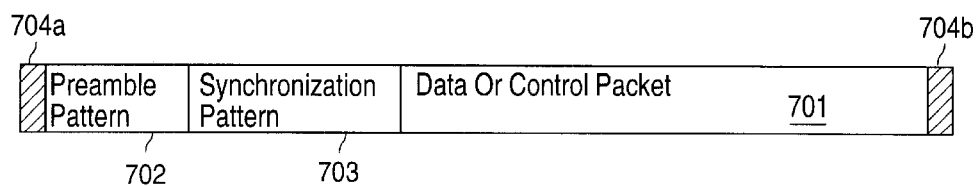
FIG. 7c shows a frame for transmitting a data or control packet 701 under the DSMA/RC protocol.
Figure 7A:
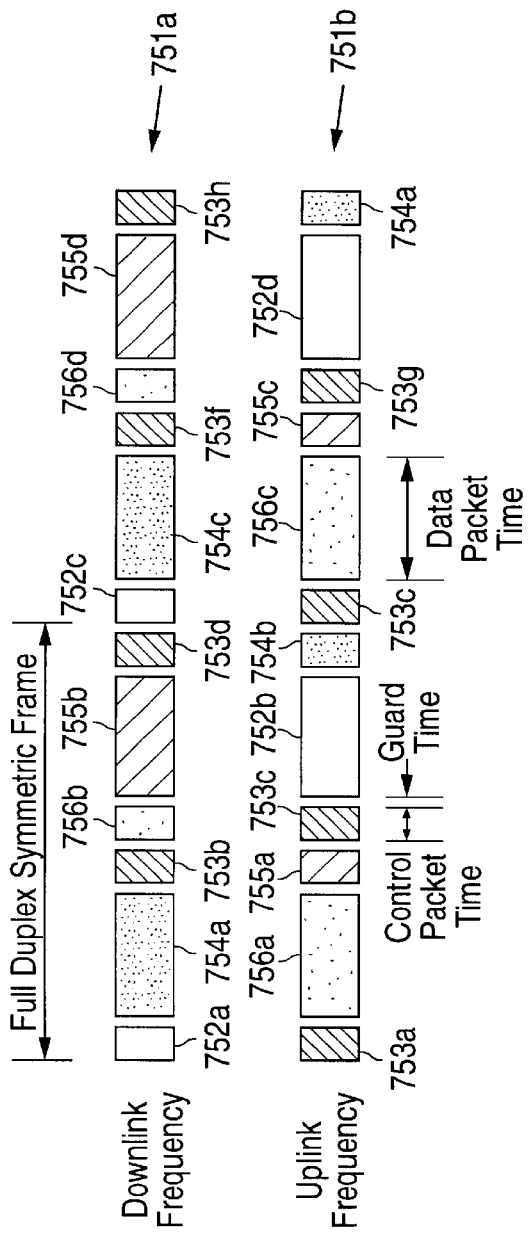
FIG. 7a illustrates a full duplex operation of the DSMA/RC protocol using physical channels 751a and 751b.
Figure 7B:
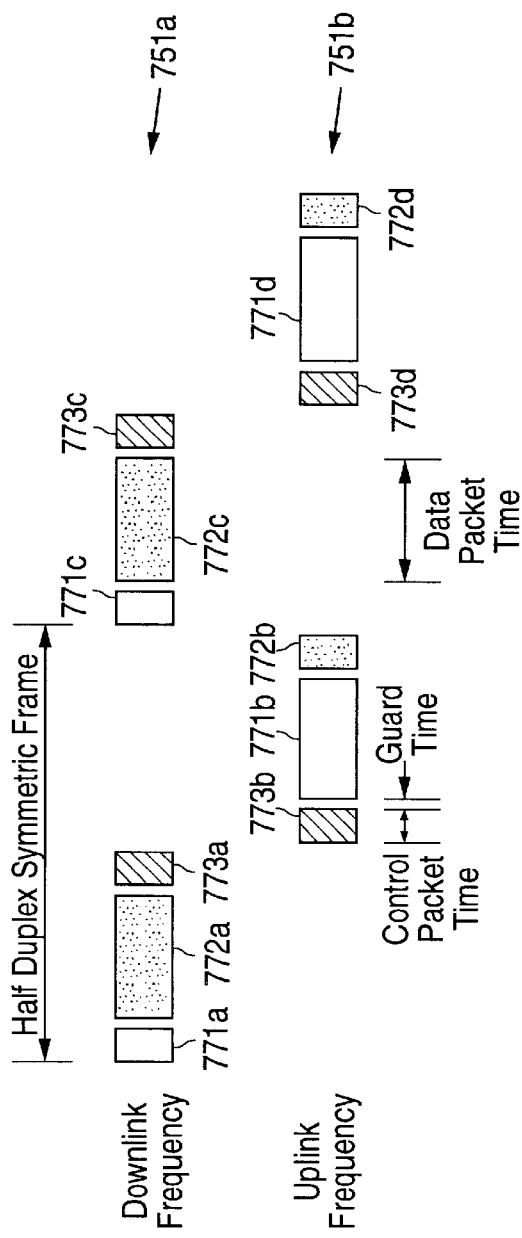
FIG. 7b illustrates a half-duplex operation of the DSMA/RC protocol using physical channels 701a and 751b.

FIG. 7c shows a frame 700 for transmitting a control or data packet 701 under the DSMA/RC protocol. As shown in FIG. 7c, in frame 700, control or data packet 701 is preceded by a 16-bit preamble pattern 702 and a 16-bit synchronization pattern 703. As mentioned above, to prevent transmissions from interfering with each other, sufficient guard time, indicated by ramp-up time 704a and ramp-down time 704b are provided before and after transmission of each packet, respectively. Preamble pattern 702 identifies whether the data or control packet is sent from a base station to a wireless data terminal, or from a wireless data terminal to a base station. Synchronization pattern 703 indicates the beginning of control or data packet 701. In the present embodiment, data packets and control packets are each provided with different formats for uplink and downlink communications. The downlink data packet format and the uplink data packet format under the DSMA/RC protocol of the present invention are illustrated respectively by downlink data packet 300 in FIG. 3 and uplink data packet 400 in FIG. 4. Similarly, the downlink control packet and the uplink control packet under the DSMA/RC protocol of the present invention are illustrated respectively by downlink control packet 500 in FIG. 5 and uplink control packet 600 in FIG. 6.

Under the DSMA/RC protocol, the wireless data terminals compete for the uplink. To acquire the uplink, each wireless data terminal monitors control packets in the message channel to which it is assigned. A base station signals the availability of an uplink message channel by setting in each of the data and control packets an asserted end-of-transmission (EOT) flag. A deasserted EOT flag signals that the uplink message channel is busy. This method of monitoring and signalling the availability of a communication channel is known in the art as "digital sensing." The base station sends "beacon" data and control packets when a message channel remains available. A beacon data or control packet is a dummy packet provided to signal that an active base station is present. In this embodiment, where local service areas of two or more base stations overlap, beacon data or control packets may not be sent to avoid co-channel interference.

To acquire an uplink, subsequent to detecting that a message channel is available, a wireless data terminal sends a first data packet at the next data packet time slot of the message channel. When the first data packet from a wireless data terminal is received, the base station grants the uplink message channel to the requesting wireless data terminal by designating a requesting wireless data terminal in an ACK control packet corresponding to the data packet received by the base station. This ACK control packet acts as a "clear-to-send" (CTS) control signal. If the ACK control packet is then received by the designated wireless data terminal, that wireless data terminal can send additional data packets in the uplink message channel. If the wireless data terminal does not receive an ACK control packet corresponding to its first data packet, the wireless data terminal retries the first data packet up to a programmable number of times at later times whenever the message channel becomes idle (i.e., using a "p-persistent" retry strategy). Upon granted the message channel, a wireless data terminal camps on the uplink and downlink physical channels until communication completes and the uplink is relinquished. Under the DSMA/RC protocol, each data packet is acknowledged by an ACK packet, which also serves as a "request-to-send" (RTS) signal for the next data packet.

Digital sensing avoids collision because a wireless data terminal will attempt to acquire an uplink only after detecting that a message channel is idle. Thus, collision occurs only among wireless data terminals in competing for an uplink message channel. Once an uplink message channel has been granted to a wireless data terminal, the uplink message channel is provided for the exclusive use by the wireless data terminal until the message channel is relinquished. Under the DSMA/RC protocol, traffic from the base station does not collide because the control or data packets are transmitted in reserved time slots.

In the case in which beacons are not sent when an uplink message channel is idle, to avoid co-channel interference, the DSMA/RC protocol operates in a manner similar to the Aloha protocol known in the art. Under that scheme, a wireless data terminal requests a message channel after detecting the absence of activity in the physical channel for a predetermined time duration.

As shown in FIG. 3, downlink data packet 300 includes a header portion 310, a data payload portion 340, and an error correction portion 350. Header portion 310 includes (i) a one-byte "Base Station Color code" field 311, identifying the base station to which the packet relates; (ii) a 1-bit "Data/Control" (D/C) field 312 set to "1", identifying packet 300 as a data packet; (iii) a 1-bit "Packet Sync" (PS) field 313, indicating whether the uplink packet is synchronous with the current packet; (iv) a 1-bit "FEC" field 314, indicating that the wireless data terminal shall perform Reed-Solomon forward error correction function; (v) a 1-bit "No ACK" (NA) field 315, indicating whether an acknowledgment (ACK) packet is required in response to the current data packet; (vi) a 1-bit "Asym" field 316, indicating whether the wireless data terminal should use asymmetric data rates as described above; (vii) a 1-bit "Full" field 317, indicating whether the channel is full duplex or half duplex; (viii) a 1-bit "Local" (LOC) field 318, indicating whether a data packet is send under the local modes described above; (ix) a start bit 319, indicating whether the current packet is the first packet of a message; (x) a stop bit 320, indicating whether the current packet is the last packet of a message; (xi) a 4-byte "Pager ESN" field 321, uniquely identifying the wireless data terminal; (xii) a 1-byte "Packet Sequence Number" field 322, identifying the packet order information to be used to re-assemble the message; and (xiii) a 1-byte "length" field 323, specifying the number of bytes in the data packet. Header portion 310 further includes seven "Reserved" (RES) bits whose functions are reserved for future expansion. All RES bits are set to the value of "0". Error correction portion 350 includes (i) a 2-byte "Checksum" field 351, representing the cyclic redundancy checksum of the packet from the beginning of data packet 300 to the last byte of data in payload 340; and (ii) 22 check bytes of RS code, 352 for error correction Uplink data packet 400 (FIG. 4) includes a header portion 410, a data payload 440, and an error correction portion 450. Uplink data packet 400 includes fields that are similar to those in downlink data packet 300. Hence, similarly named fields in uplink data packet 400 are not further described. Header portion 410 of uplink data packet 400 includes (i) a one-byte "Base Station Color code" field 411; (ii) a 1-bit "Data/Control" (D/C) field 412 set to "1", identifying packet 400 as a data packet; (iii) a 1-bit "FEC" field 414; (iv) a 1-bit "End-of-Transmission" (EOT) field 415; (v) a start bit 419; (vi) a stop bit 420; (vii) a 4-byte "Pager ESN" field 421; (viii) a 1-byte "Packet Sequence Number" field 422; and (ix) a 1-byte "length" field 423. EOT field 415 of data packet 400 indicates whether the current packet is the last packet of the last message of a connection.

In this embodiment, the following types of control packets are provided: (i) an ACK packet used in both the uplink and the downlink; (ii) a NACK packet used in both the uplink and the downlink; (iii) a Wake-Up Response packet from a wireless data terminal to a base station; (iv) an LRR packet from a wireless data terminal to a base station requesting registration; and (v) an LRG packet from a base station to a wireless data terminal indicating that local registration is completed. The wake-up response, LRR and LRG packets are used in a command channel.

FIG. 5 illustrates the format of a downlink control packet 500. Downlink control packet 500 includes a header portion 510, a fixed-length data payload 540, and an error correction portion 550. Fields in downlink control packet 500 that are the same as in downlink data packet 300 are not further described. Header portion 510 includes (i) a one-byte "Base Station Color code" field 511; (ii) a 1-bit "Data/Control" (D/C) field 512 set to "0", identifying packet 500 as a control packet; (iii) a 1-bit "Packet Sync" (PS) field 513; (iv) a 1-bit "FEC" field 514; (v) a 1-bit "EOT" field 515; (vi) a 1-bit "Asym" field 516; (vii) a 1-bit "Full" field 517; (viii) a 1-bit "Local" (LOC) field 518; and (ix) a 2-bit "Op-code" 519, identifying the function of control packet 500. Data payload 540 of downlink control packet 500 contains two bytes of data, first data byte 541 and second data byte 542, which are associated with the functions of downlink control packet 500. For instance, in an ACK packet, first data byte 541 contains the value of the received data packet's sequence number (PSN) plus 1. In an NACK packet, first data byte 541 contains the value of the received data packet's PSN. In an LRG packet, first data byte 541 is set to "1" to indicate that local registration request is granted. For the other types of control packet, such as Wake-Up Response and LRR, first data byte 541 is not used. In all types of control packets, second data byte 542 contains the System ID, identifying the wireless data network. Following data payload 540, error correction portion 550 includes (i) a 2-byte "Checksum" field 551, representing the cyclic redundancy checksum of the packet from the beginning of data packet 500 to the last byte of data in payload 540; and (ii) a 6-byte Reed Solomon code 552 for error correction function.

Uplink control packet 600, as shown in FIG. 6, is similar to downlink control packet 500. Similarly named fields in uplink control packet 600 are not further described. Header portion 610 of uplink control packet 600 includes (i) a one-byte "Base Station Color code" field 611; (ii) a 1-bit "Data/Control" (D/C) field 612 set to "0", identifying packet 600 as a control packet; (iii) a 1-bit "FEC" field 614; and (iv) a 2-bit "Op-code" 619. Data payload 640 of uplink control packet 600 is defined in the same manner as data payload 540 of downlink control packet 500.

Data integrity can be enhanced by the use of error correcting codes, such as Reed-Solomon (RS) code. In this embodiment, a 17-byte RS code, including 6 "check" bytes is used for a control packet, and a 66-byte RS code, including 22 check bytes is used for a data packet. Other techniques, such as interleaving or bit scrambling, can be used to further enhance transmission integrity by avoiding long runs of 1's or 0's.

The above detailed description are provided to illustrate the specific embodiments of the present invention and is not intended to be limiting. Numerous modifications and variations within the scope of the present invention are possible. The present invention is defined by the appended claims thereto.

We claim:

1. A two-way wireless data network, comprising:
   a communication channel providing first and second sets of time slots;
   a plurality of mobile wireless data terminals each having a transceiver for communicating by radio in said communication channel, said plurality of mobile wireless data terminals being assigned said second set of time slots for transmitting a request for access to said communication channel;
   a base station serving a service area and having a transceiver for communicating by radio in said communication channel, said base station sending a message in said first set of time slots indicating whether said communication channel is available;
   wherein said plurality of mobile wireless data terminals monitor said communication channel for said message from said base station; a first one of said plurality of mobile wireless data terminals transmits said request for access in said second set of time slots upon receiving said message; and said base station, upon receiving said request for access, grants said request for access to said communication channel to said first one of said plurality of mobile wireless data terminals.

2. The two-way wireless data network of claim 1 wherein said message is provided in a field within a header of a control packet.

3. The two-way wireless data network of claim 2, wherein said message comprises an acknowledgment message sent by said base station in response to a previous message received from another one of said plurality of mobile wireless data terminals.

4. The two-way wireless data network of claim 1, wherein said communication channel uses a first frequency for said first set of time slots and a second frequency for said second set of time slots.

5. The two-way wireless data network of claim 1, wherein said first and second sets of time slots are non-overlapping.

6. The two-way wireless data network of claim 1, wherein said communication channel is divided into multiple logical channels.

7. The two-way wireless data network of claim 6, wherein said multiple logical channels include a logical channel in which data packets are sent from said plurality of mobile wireless data terminals to said base station, and control packets are sent from said base station to said plurality of mobile wireless data terminals.

8. The two-way wireless data network of claim 7, wherein said data packets are sent in a predetermined sequence by said first one of said plurality of mobile wireless data terminals, wherein each data packet is acknowledged by said base station in one of said control packets, and wherein upon receiving said control packet in which said data packet is acknowledged, said first one of said plurality of mobile wireless data terminals sends the next data packet in said predetermined sequence.

9. In a two-way wireless data network, a method comprising:
providing a communication channel having first and second sets of time slots, said second set of time slots being assigned to a plurality of mobile wireless data terminals;
providing a base station serving a service area and having a transceiver for communicating by radio in said communication channel;
sending a message from said base station in said first set of time slots indicating whether said communication channel is available;
monitoring said communication channel for said message by said plurality of mobile wireless data terminals;
transmitting in said second set of time slots a request for access to said communication channel from a first one of said plurality of mobile wireless data terminals upon receiving said message, each of said plurality of wireless data terminals having a transceiver for communicating by radio in said communication channel; and
receiving at said base station said request for access to said communication channel, and granting said request for access to said communication channel to said first one of said plurality of mobile wireless data terminals.

10. The method of claim 9 wherein said message is provided in a field within a header of a control packet.

11. The method of claim 10, wherein said message comprises an acknowledgment message sent by said base station in response to a previous message received from another one of said plurality of mobile wireless data terminals.

12. The method of claim 9, wherein said communication channel uses a first frequency for said first set of time slots and a second frequency for said second set of time slots.

13. The method claim 9, wherein said first and second sets of time slots are non-overlapping.

14. The method of claim 9, wherein said communication channel is divided into multiple logical channels.

15. The method of claim 14, wherein said multiple logical channels include a logical channel in which data packets are sent from said plurality of mobile wireless data terminals to said base station, and control packets are sent from said base station to said plurality of mobile wireless data terminals.

16. The method of claim 15, wherein said data packets are sent in a predetermined sequence by said first one of said plurality of mobile wireless data terminals, wherein each data packet is acknowledged by said base station in one of said control packets, and wherein upon receiving said control packet in which said data packet is acknowledged, said first one of said plurality of mobile wireless data terminals sends the next data packet in said predetermined sequence.

17. The two-way wireless data network of claim 1, wherein said request for access comprises a first data packet sent by said first one of said plurality of mobile wireless data terminals.

18. The two-way wireless data network of claim 1, wherein said base station grants said request for access to said first one of said plurality of mobile wireless data terminals by transmitting a control packet designating said first one of said plurality of mobile wireless data terminals.

19. The two-way wireless data network of claim 1, wherein said plurality of mobile wireless data terminals refrain from transmitting said request for access when said message received from said base station indicates that said communication channel is not available.

20. The method of claim 9, wherein said transmitting in said second set of time slots a request for access to said communication channel from a first one of said plurality of mobile wireless data terminals comprises:
transmitting a first data packet from said first one of said plurality of mobile wireless data terminals upon receiving said message.

21. The method of claim 9, wherein said granting said request for access to said communication channel to said first one of said plurality of mobile wireless data terminal comprises:
transmitting a control packet designating said first one of said plurality of mobile wireless data terminals.

22. The method of claim 9, wherein said plurality of mobile wireless data terminals refrain from transmitting said request for access when said message received from said base station indicates that said communication channel is not available.

* * * * *